Figure 7:
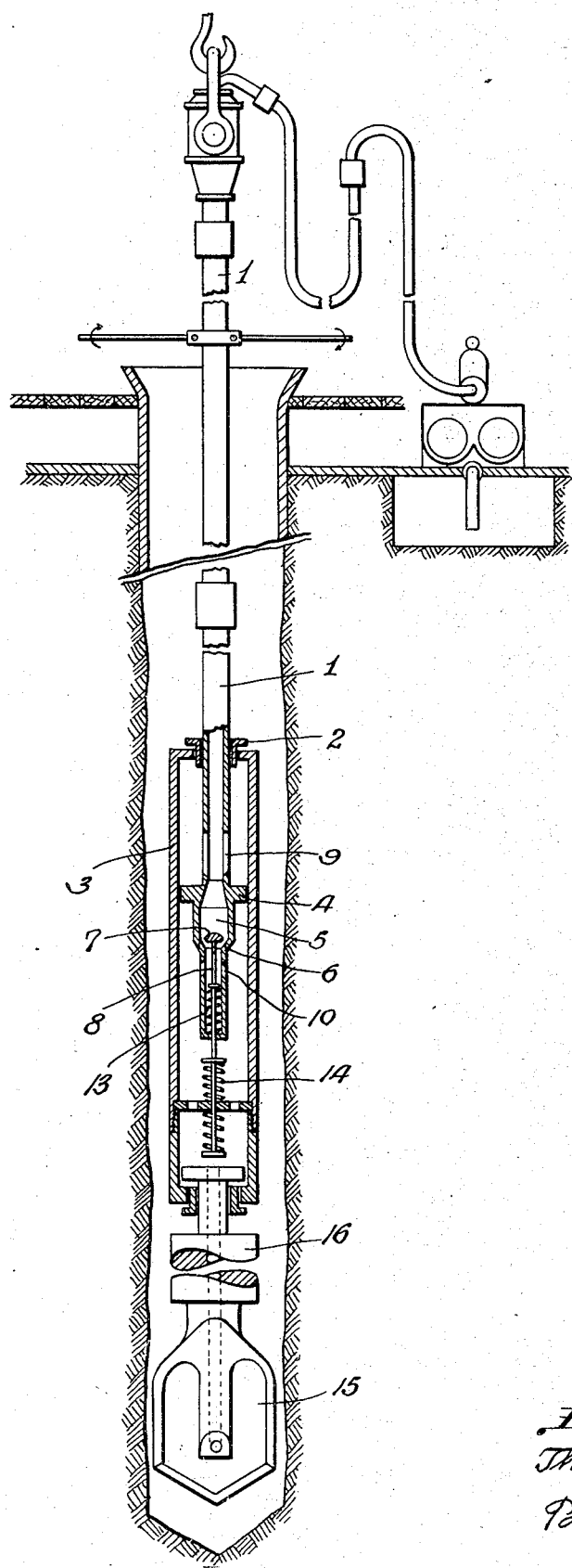

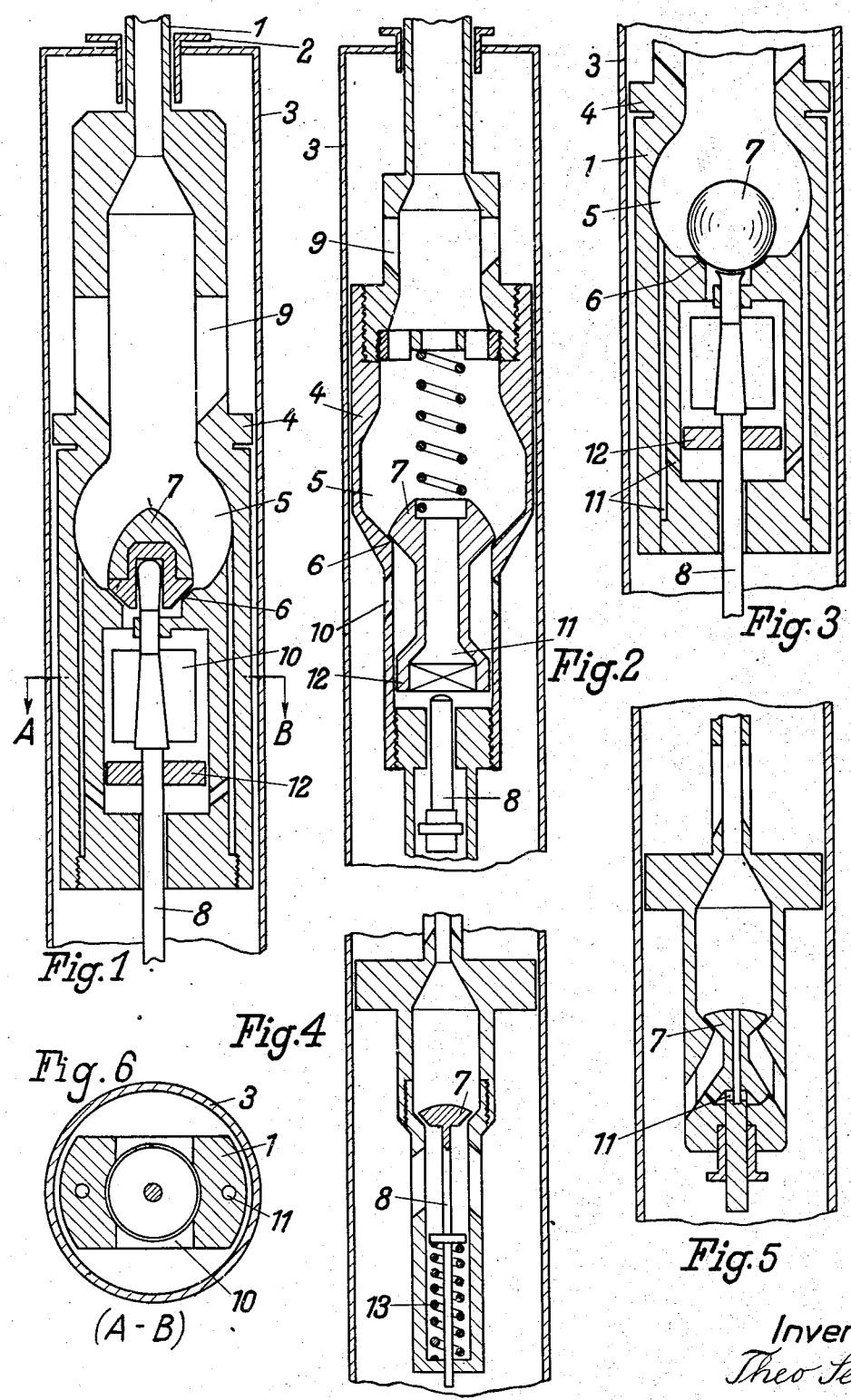

Sept. 27, 1938. T. SEIFER 2,131,392
MOTOR WORKING IN A BORE HOLE BY MEANS OF A RINSING LIQUID
Filed Nov. 1, 1935 2 Sheets-Sheet 2

Patented Sept. 27, 1938

2,131,392

UNITED STATES PATENT OFFICE 2,131,392

MOTOR WORKING IN A BORE HOLE BY MEANS OF A RINSING LIQUID

Theo Seifer, Berlin, Germany

Application November 1, 1935, Serial No. 47,890
In Germany September 23, 1933

6 Claims. (Cl. 255—4)

This invention relates to hydraulic motors operated in a bore-hole by means of the flushing fluid in which the chisel is fixed to a cylinder which slides on a piston connected with the tubing.

Such motors are controlled by spring-actuated valves. When closed these valves are subject to an hydraulic pressure corresponding to the weight of the mass to be raised, and this pressure has to be overcome by the spring on opening the valve.

According to my invention the valve is partly or totally released from this pressure so that the opening spring can be weaker than before.

The valve may be released by making the valve body, which closes the openings through which the water flows down to the chisel, simultaneously close a hollow space situated beneath the valve body and communicating with the interior of the tubing. By choosing the lower surface of the valve body touched by the flushing fluid exactly equal to the upper surface of the valve body touched by the flushing water the valve body will be wholly released from the hydraulic pressure. However to ensure a perfect closure of the valve the lower surface will be chosen somewhat smaller than the upper one so that the valve is pressed against its seat by a small excess of pressure.

Another method of releasing the valve consists in providing, besides the spring for opening the valve shown, for instance, in my specification No. 2,108,946 issued February 22, 1938 (spring $r$), a further spring having a strength nearly sufficient to compensate the pressure acting on the valve.

In the annexed drawings, Figs. 1 to 5, five different modifications of the invention are illustrated in vertical cross-section. Fig. 6 is a horizontal cross-section on the line A—B of Fig. 1. Fig. 7 is a diagrammatic view showing the cooperation of the tubing, the cylinder and the bit or chisel.

In the modifications shown in Figs. 1, 2, 3, and 5 the valve is released by the lower surface of the valve body (or an element acting on the same) being exposed to the flushing fluid flowing in the tubing.

The valve shown in Fig. 4 is released by a spring.

Referring first to Fig. 1, 1 is the stationary bore tubing on which a cylinder 3 slides with a stuffing box 2. The tubing 1 is equipped with a piston 4 over which the cylinder 3 slides. The hollow space of the tubing is enlarged to form a valve chamber 5 in which the valve seat 6 is formed. 7 designates the valve body. 8 is a rod cooperating with the valve body 7, 9 and 10 are slots provided in the tubing 1. 11 are ducts for the releasing liquid. 12 is a piston connected to the valve rod 8. When the valve 7 assumes the position shown in Fig. 1, the passage in the tubing is closed. Now when the flushing water enters the cylinder above the piston 4 so as to raise the latter, the total hydraulic pressure required for lifting the cylinder would act upon the valve body 7. But owing to the fact that now the flushing water is allowed to flow by the ducts 11 into the space beneath the piston 12, the hydraulic pressure acting on the opposite sides of the valve body whereby this body is partly or wholly released from the load.

In the modification shown in Fig. 2 the valve body 7 is shaped in the form of a hollow cylinder which is enlarged at its bottom end to a piston 12 sliding in the tubing. A spring resting on the body 7 presses the latter against its seat. The valve body 7 is raised when the valve rod 8 strikes on a cross-bar provided in the piston 12. A distance as long as desired is left between this cross-bar and the rod 8 whereby the stroke of the valve is made more or less independent of the stroke of the cylinder.

In Fig. 3 the valve 7 is shaped to form a ball 7. This ball lies loosely on the valve bar 8. But owing to the fact that the valve rod 8 is connected with the piston 12 and the lower surface of which is in contact with the flushing water and communicates with the interior of the tubing, and is nearly equal to the surface of the ball 7 which is loaded by hydraulic pressure, the valve body 7 is also released from the hydraulic pressure.

In the modifications shown in Figs. 1 to 3 the water enters the cylinder 3 from the tubing, thereby lifting the cylinder until the spring 14 (Fig. 7) inserted between the tubing and the cylinder 3 is compressed to such an extent that it overcomes the weight of the valve body 7.

In the modification shown in Fig. 5 the valve body 7 is double-seated. Here the releasing water is conducted, as in the valve shown in Fig. 2, through a duct bored in the valve body to the lower surface of the body.

Fig. 4 shows the valve rod 8 connected with a disk and a releasing spring 13 arranged under this disk which spring is compressed when the cylinder 3 after opening the valve 7 drops down, because the valve rod is taken along downwards when the cylinder drops down. In this case the water pressure is compensated by the spring 13 so that the spring 14 is only to lift the weight of the valve including the part suspended therefrom.

I claim:—

1. In a hydraulic motor operated by means of a flushing liquid in a well, the combination of a hollow shaft, a piston connected with said shaft, a cylinder slidably enclosing the piston, a chisel carried by said cylinder, the piston being provided with an opening, a valve adapted to close said opening, a spring inserted between the valve and the cylinder and actuating the valve and a member inserted between the valve and the stationary part of the motor which member releases the valve when opened from the water pressure acting thereon, the tubing being provided with outlet ducts below the valve.

2. In a hydraulic motor operated by means of a flushing liquid in a well, the combination of a hollow shaft, a piston connected with said shaft, a cylinder slidably enclosing the piston, a chisel carried by said cylinder, the piston being provided with an opening, a valve adapted to close said opening, a spring inserted between the valve and the cylinder and actuating the valve, a rod inserted between the valve and the stationary part of the motor which rod releases the valve when opened from the water pressure acting thereon, the tubing being provided with outlet ducts below the valve, and a second piston adapted to slide in the valve chamber beneath its openings and connected with the said rod, the lower side of the said second piston communicating with the hollow tubing.

3. In a hydraulic motor operated by means of a flushing liquid in a well, the combination of a hollow shaft, a piston connected with said shaft, a cylinder slidably enclosing the piston, a chisel carried by said cylinder, a chamber communicating with the hollow tubing and provided with openings for withdrawing flushing water, a valve body shaped in the form of a hollow cylinder and adapted to slide with its lower end beneath the openings on the walls of the chamber.

4. In a hydraulic motor operated by means of a flushing liquid in a well, the combination of a hollow shaft, a piston connected with said shaft, a cylinder slidably enclosing the piston, a chisel carried by said cylinder, the piston being provided with an opening, a valve adapted to close said opening, a spring inserted between the valve and the cylinder and actuating the valve, a rod actuated by the upwards and downwards sliding cylinder and controlling the valve body, a collar on the said rod, a releasing spring abutting on the one hand against the said collar and on the other hand against the wall of the tubing, the force of the said spring being nearly equal to the hydraulic pressure acting upon the valve body.

5. In a hydraulic motor operated by means of a flushing liquid in a well, the combination of a hollow shaft, a piston connected with said shaft, a cylinder slidably enclosing the piston, a chisel carried by said cylinder, a chamber communicating with the hollow tubing and provided with openings for withdrawing flushing water towards the chisel, a valve body adapted to shut off the said openings against the interior of the chamber when the valve is closed, the valve body being touched by the flushing water at its upper and lower side when the valve is closed, and ducts in the lower part of the wall of the tubing adapted to connect the lower side of the valve body with the part of the tubing situated above the valve body.

6. In a hydraulic motor operated by means of a flushing liquid in a well, the combination of a hollow shaft, a piston connected with said shaft, a cylinder slidably enclosing the piston, a chisel carried by said cylinder, the piston being provided with an opening, a valve adapted to close said opening, a spring for opening the valve, a rod inserted between the said spring and the body of the valve, the said rod being divided into two parts between which an interstice is left, a collar provided on the said rod, and a releasing spring abutting against the said collar on the one hand and against the wall of the tubing on the other hand.

THEO SEIFER.